(12) United States Patent
Dzikowicz

(10) Patent No.: US 7,048,977 B2
(45) Date of Patent: May 23, 2006

(54) LATEX FILM COMPOUND WITH IMPROVED TEAR RESISTANCE

(75) Inventor: Robert Thomas Dzikowicz, Monroe, CT (US)

(73) Assignee: R.T. Vanderbilt Company, Inc., Norwalk, CT (US)

( * ) Notice: Subject to any disclaimer, the term of this patent is extended or adjusted under 35 U.S.C. 154(b) by 155 days.

(21) Appl. No.: 10/670,169

(22) Filed: Sep. 24, 2003

(65) Prior Publication Data

US 2004/0063832 A1  Apr. 1, 2004

Related U.S. Application Data

(63) Continuation-in-part of application No. 09/908,004, filed on Jul. 18, 2001, now Pat. No. 6,653,380.

(51) Int. Cl.
*B32B 1/10* (2006.01)
*B32B 25/08* (2006.01)

(52) U.S. Cl. .............. 428/35.7; 428/36.8; 428/36.9; 428/36.91; 428/492; 428/495; 428/515; 428/516; 428/519; 428/520; 428/521; 428/522

(58) Field of Classification Search ............. 428/35.7, 428/35.8, 36.9, 36.91, 492, 495, 515, 516, 428/519, 520, 521, 522
See application file for complete search history.

(56) References Cited

U.S. PATENT DOCUMENTS

| 2,923,753 A | 2/1960 | Leyland ................. 260/752 |
| 4,435,532 A | 3/1984 | Thörmer et al. ............ 524/92 |
| 5,158,997 A | 10/1992 | Berta ..................... 524/83 |
| 5,196,462 A | 3/1993 | Berta ..................... 524/94 |
| 5,350,785 A | 9/1994 | Sander et al. ............ 524/100 |
| 6,028,131 A | 2/2000 | Meier et al. ............. 524/171 |
| 6,218,473 B1 | 4/2001 | Sandstrom ............... 525/191 |
| 6,232,380 B1 | 5/2001 | Conroy et al. ........... 524/291 |
| 6,492,446 B1 | 12/2002 | Kajiwara et al. .......... 524/157 |
| 6,492,447 B1 | 12/2002 | Chestnutt et al. ......... 524/157 |
| 6,653,380 B1 * | 11/2003 | Dzikowicz ............... 524/392 |
| 6,673,404 B1 * | 1/2004 | Yeh et al. ............... 428/35.7 |
| 6,797,755 B1 * | 9/2004 | Meier et al. ............. 524/155 |

FOREIGN PATENT DOCUMENTS

| CA | 2353607 | 7/2001 |
| EP | 0953597 | 11/1999 |
| EP | 0953597 A2 | 11/1999 |
| GB | 700463 | 12/1953 |
| GB | 1001344 | 8/1965 |
| WO | 9957190 | 11/1999 |

OTHER PUBLICATIONS

*Extending the Shelf Life of Latex Products*, International Latex Conference, Akron, Ohio. Jul. 2000.
*Using Antioxidant to Inhibit the Discoloration of Latex Films*, International Latex Conference, Akron, Ohio. Jul. 1999.
*ZMTI Antioxidant Synergist*, Malaysian Rubber Glove Manufacturers Association (MARGMA) Conference, Kuala Lumpur, Malaysia. Sep. 2002.
*ZMTI/MTI Antioxidant Synergists*, Latex 2002, International Conference on Latex and Latex Based Products, Berlin, Germany. Dec. 2002.
*ZMTI Antioxidant Synergist*, by Robert T. Dzikowicz, Indian Rubber Journal, Nov./Dec. 2002, V. 66, pp. 126 to 130.

* cited by examiner

*Primary Examiner*—Robert D. Harlan
(74) *Attorney, Agent, or Firm*—Norris, McLaughlin & Marcus

(57) ABSTRACT

The invention relates to a method of enhancing the tear resistance, tensile strength, and the aging properties of a latex product by adding an antioxidant synergist with an antioxidant to a latex compound comprising of a polymer and a curing system comprised of an activator, crosslinker and accelerator and to the latex products formed therefrom. Antioxidant synergists which can be used with the present invention include 2-mercaptobenzimidazole (MBI), 2-mercaptotoluimidazole (MTI), zinc 2-mercaptobenzimidazole (ZMBI) and zinc 2-mercaptotoluimidazole (ZMTI). The latex products formed may be gloves but can also include threads, balloons and other latex-related products.

11 Claims, 8 Drawing Sheets

LATEX FILM COMPOUND WITH IMPROVED TEAR RESISTANCE

This is a continuation-in-part of U.S. Ser. No. 09/908,004, filed Jul. 18, 2001 now U.S. Pat. No. 6,653,380.

FIELD OF THE INVENTION

The present invention relates to latex film compounds having enhanced tear resistance, tensile strength, and aging properties without any sacrifices in elasticity (elongation).

BACKGROUND OF THE INVENTION AND DESCRIPTION OF THE RELATED ART

Although latex products are well known in the art, an inherent problem associated with these products is the degradation of these products over time due to oxidation which shortens the useful life of the latex product. In the case of natural rubbers, oxidation results in chain scission which in turns causes a gooey, sticky rubber whereas in the case of synthetic rubbers, oxidation results in further cross-linking of the carbon chains which in turn causes a stiff and brittle rubber. It follows that producing a latex product which is more resistant to oxidation would produce a product with enhanced tear resistance, tensile strength, elasticity and a longer useful life.

Latex products are commonly produced by curing a mixture of a polymer or copolymer, an optional stabilizing system and a curing system comprised of an accelerator an activator and a crosslinker.

In order to make the latex product more resistant to oxidation, an antioxidant is also added during production of the latex compound. Mercaptoarylazole compounds have previously been used as antioxidants. However, mercaptoarylazole compounds can also serve as accelerators. U.S. Pat. No. 4,435,532 used 2-mercaptobenzothiazole (col. 4, Example 4) as a heat stabilizer and deemed that "This class of compounds is unusable due to its powerfully accelerating effect on vulcanization since it restricts the possibility of processing the product and does not provide the necessary reliability in operation."

Surprisingly, the applicant has discovered that combining an anti-oxidant with a mercaptoarylazole compound results in latex products which possess enhanced tear resistance, tensile strength, elongation and a longer useful life.

SUMMARY OF THE INVENTION

It is an object of the invention to enhance the tear resistance, tensile strength, elasticity and aging properties of a latex product by adding an antioxidant and an antioxidant synergist to a latex compound comprising a polymer and a curing system comprised of an accelerator, an activator and a crosslinker.

The basic components of the latex product of the current invention comprise a polymer and a curing system comprising an accelerator, an activator and a crosslinker. To this composition, an antioxidant and an antioxidant synergist was added.

The polymer can be selected from any number of polymers and copolymers associated with the making of latex products and can be selected from the group consisting of natural rubber, acrylonitrile, polychloroprene, styrene butadiene, butyl, isoprene, ethylene propylene diene, chlorosulfonated polyethylene, and carboxylated and hydrogenated derivatives thereof.

A stabilizing system can be optionally added, though it is not necessary. While it is understood that latexes must be stabilized, the common practice is to achieve this during the polymerization stage. Therefore, it need not be added for the purposes of the current invention. The skilled person will understand that a stabilizing system, if needed, can be added to the claimed compound prior to formation of a final latex article from said compound. Natural rubber latex is stabilized naturally, and in this case a stabilization system is not necessary. A stabilizing system may be selected from any number of stabilizers commonly associated with the making of latex products and can be selected from the group consisting of modifiers of pH like ammonia, sodium and potassium hydroxide, tetrasodium pyrophosphate, amines, caseinate, glues, gelatin, natural and synthetic gums, organic soaps and surfactants.

The curing system is comprised of an activator, a crosslinker and an accelerator.

Suitable accelerators for the curing system can be selected from the group consisting of thiazoles, sulfenamides, dithiocarbamates, thiurams, xanthates, thioureas, guanidines, aldehyde amines and peroxides.

Suitable activators for the curing system can be selected from the group consisting of metal oxides such as zinc oxide, magnesium oxide and lead oxide.

Suitable cross-linkers for the curing system can be selected from the group consisting of sulfur, zinc oxide, zinc chloride and carbon to carbon crosslinks initiated by peroxides.

The antioxidant can be selected from any number of antioxidants selected from the group consisting of amines, diamines, diphenylamines, octylated diphenylamines, reaction products of amines, phenols, alkylated phenols, arylated phenols, bisphenol A, isocyanurates, butyl phenols, fortified phenols, phosphited phenols, butylated phenols, phenolics, reaction products of p-cresol and cyclopentadiene, styrenated phenols, hydroquinolines and dithiocarbamates.

Preferred embodiments of the anti-oxidants are phenolic antioxidants or amine antioxidants.

The antioxidant synergist for the purposes of this invention is a mercaptoarylazole compound and salt forms thereof. This includes though is not limited to mercaptoarylthiazoles and mercaptoarylimidazole compounds. A preferred embodiment of the mercaptoarylthiazole is 2-mercaptobenzothiazole. Preferred embodiments of the mercaptoarylimidazole are 2-mercaptobenzimidazole (MBI) and 2-mercaptotoluimidazole (MTI). Preferred salt forms of the mercaptoarylazole compounds are zinc salts, e.g. zinc 2-mercaptobenzimidazole (ZMBI) and zinc 2-mercaptotoluimidazole (ZMTI).

It is noted that the term "antioxidant synergist" is distinguished from the term "antioxidant" in that the antioxidant synergist is able to enhance the antioxidative effect when added in combination with a primary antioxidant. However, using the antioxidant synergist alone may result in deterioration of one or more of the properties of the latex product, i.e. tensile strength, tear strength, elongation and/or useful life.

The sulfur, zinc oxide or peroxide cured rubber composition may also contain conventional additives including surfactants, reinforcing agents, fillers, peptizing agents, pigments, stearic acid, accelerators, sulfur vulcanizing agents, antiozonants, antioxidants, activators, initiators, plasticizers, waxes, prevulcanization inhibitors, fire retardants and colorants.

By adjusting the ratios of the antioxidants from 0.125 parts per hundred dry rubber (PHR) to 4 PHR and adjusting the antioxidant synergist from 0.1 PHR to 4 PHR, the tear strength of the latex film will improve from 5–100%.

For synthetic latex films, tear strength increased a minimum of 15–33% when an antioxidant and an antioxidant synergist were used.

DETAILED DESCRIPTION OF THE INVENTION

The base latex compounds include a polymer and a curing system comprising an accelerator, an activator and a crosslinker. To these compounds, an antioxidant and the toluimidazole antioxidant synergists were added.

The following examples show that the inclusion of an antioxidant synergist such as 2-mercaptotoluimidazole (MTI) or the zinc salt of 2-mercaptotoluimidazole (ZMTI) to a latex compound significantly improves the tensile strength, tear strength, and useful life of a latex film without sacrificing elasticity or elongation. In the examples, an optional stabilizing system and film conditioner are also present, though the skilled person will understand that these are not required to achieve the goals of the invention. Latex compounds formed according to the following examples, but without the optional stabilizing system, may therefore be described alternatively as precursors for final articles, to which a stabilizing system may be added during the polymerization stage prior to the formation of the final useful latex article. Also, in the examples, a film surface conditioner is used, such as sulfated methyl oleate. This may be optionally added in order to avoid surface defects during the film formation. However, the skilled person will understand that such a conditioner is not required when working with latexes that do not readily exhibit surface defects. Moreover, in any case, the film surface conditioner is not directly related to the activity of the inventive aspect, and therefore may be left out without adversely affecting the improved tear strength.

EXAMPLES

Abbreviations used:
PHR—parts per hundred by weight of dry rubber
ZMTI—zinc 2-mercaptotoluimidazole
MTI—2-mercaptotoluimidazole

Example 1

Natural Rubber with Amine Anti-oxidant

High Ammonia Natural Rubber latex is used as the base polymer, sodium lauryl sulfate is the stabilizer, sulfated methyl oleate is a film surface conditioner. The zinc oxide, sulfur and dithiocarbamate accelerator comprise the curing system.

|  | PHR |
|---|---|
| High Ammonia Natural Rubber from Latex (NR) | 100 |
| Sodium Lauryl Sulfate | 1 |
| Zinc Oxide | 0.5 |
| Sulfur | 0.5 |
| Dithiocarbamate Accelerator | 0.75 |
| Potassium Hydroxide | 0.15 |
| Sulfated Methyl Oleate | 1 |

To this composition, the amine antioxidant octylated diphenylamine (ODPA) and the antioxidant synergists ZMTI and MTI were added as follows:

| | PHR | | | | | |
|---|---|---|---|---|---|---|
| | 1 | 2 | 3 | 4 | 5 | 6 |
| ODPA | 1 | 2 | 1 | 1 | 0 | 0 |
| ZMTI | 0 | 0 | 1 | 0 | 1 | 0 |
| MTI | 0 | 0 | 0 | 1 | 0 | 1 |

Figure 1:
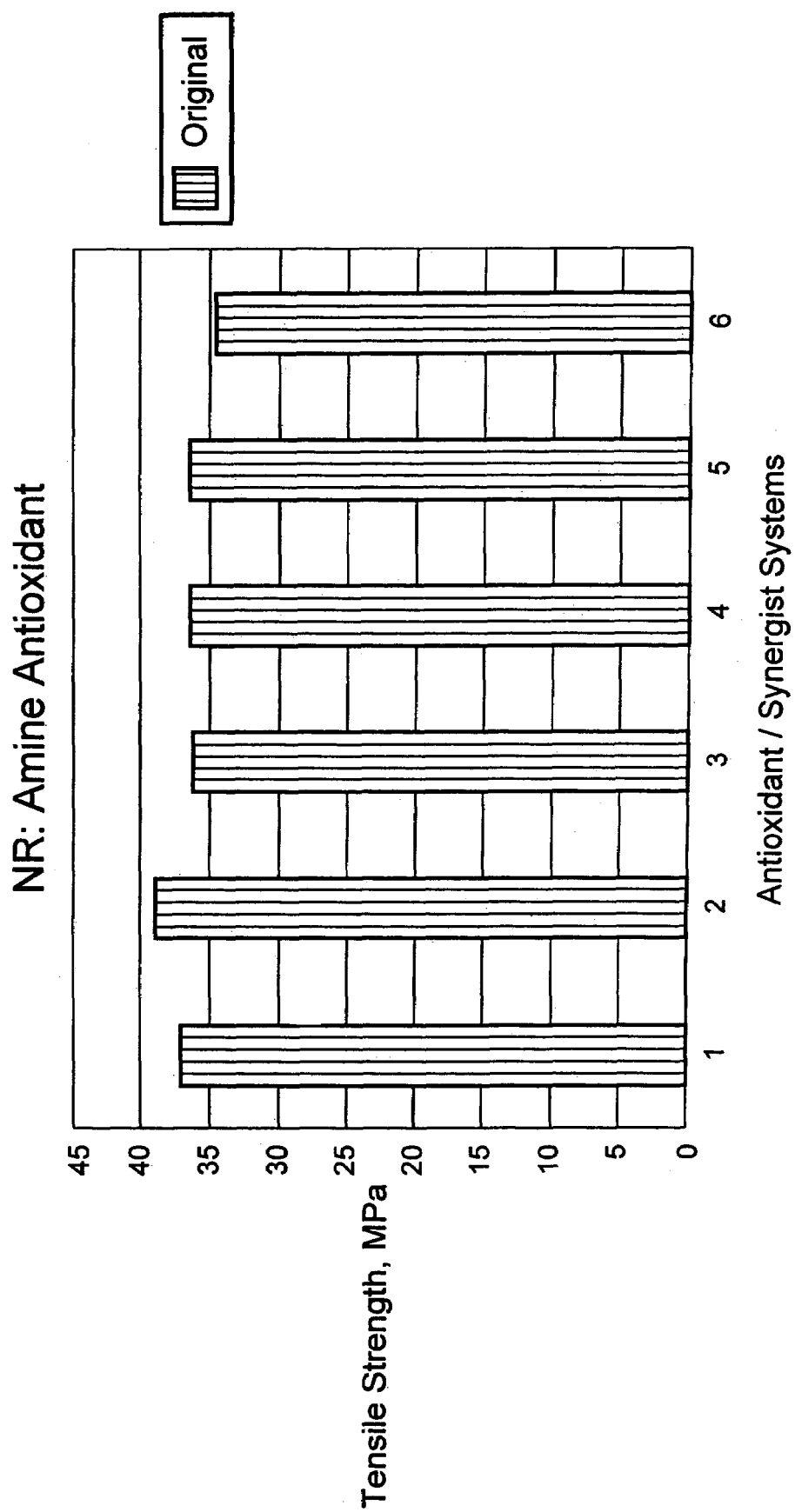
FIG. 1 is a chart showing the effect of a 30 minute cure at 100° C. on tensile strength when amine antioxidant octylated diphenylamine (ODPA) and the antioxidant synergists ZMTI and MTI were added.

FIG. 1 shows the effect of a 30 minute cure at 100° C. on tensile strength. It can be seen that all six tests have roughly a tensile strength of about 35 MPa.

Figure 2:
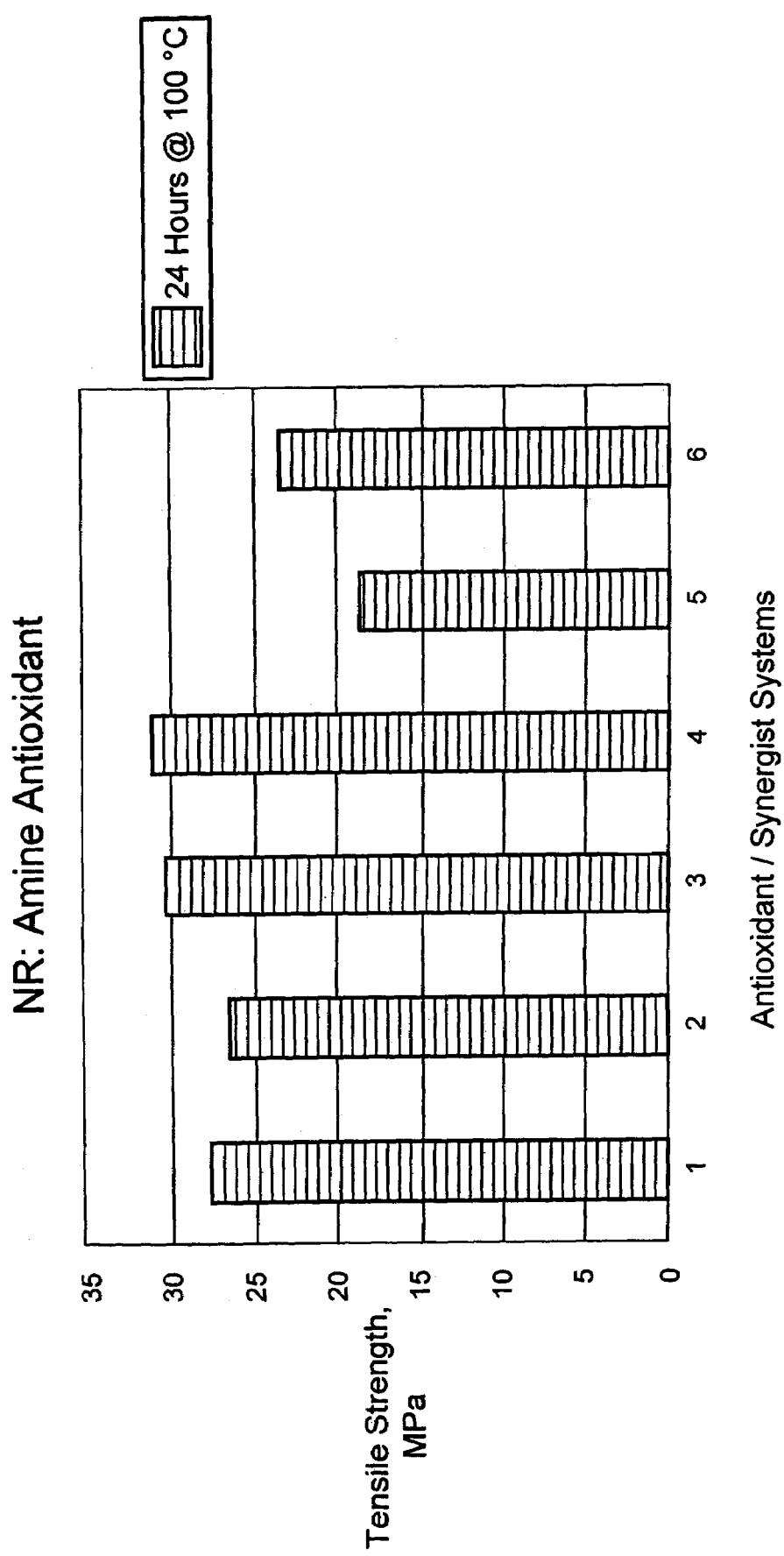
FIG. 2 is a chart showing the simulation of the aging process of natural rubber when exposed to temperatures of 100° C. for 24 hours.

To simulate the aging process of the natural rubber, the compositions were exposed to temperatures of 100° C. for 24 hours. The results are seen in FIG. 2.

It can be seen that the addition of ZMTI (test 3) or MTI (test 4) decreased the loss of tensile strength relative to the addition of an antioxidant alone (tests 1 and 2). It can also be seen that doubling the concentration of antioxidant (test 2) actually accelerated the degradation process. Note that the addition of ZMTI (test 5) or MTI (test 6) alone resulted in tensile strengths which were even worse than the addition of antioxidant alone.

It is also noted that while the ZMTI film (test 3) had a slightly lower tensile strength relative to MTI film (test 4), the ZMTI film showed a higher brightness and enhanced resistance to copper staining.

Example 2

Natural Rubber with Phenolic Antioxidant

High Ammonia Natural Rubber latex is used as the base polymer, sodium lauryl sulfate is the stabilizer, sulfated methyl oleate is a film surface conditioner. The zinc oxide, sulfur and dithiocarbamate accelerator comprise the curing system.

|  | PHR |
| --- | --- |
| High Ammonia Natural Rubber from Latex (NR) | 100 |
| Sodium Lauryl Sulfate | 1 |
| Zinc Oxide | 0.5 |
| Sulfur | 0.5 |
| Dithiocarbamate Accelerator | 0.75 |
| Potassium Hydroxide | 0.15 |
| Sulfated Methyl Oleate | 1 |

To this composition, the phenolic antioxidant polybutylated bisphenol A (PBBA) and the antioxidant synergists ZMTI and MTI were added as follows:

|  | PHR | | | |
| --- | --- | --- | --- | --- |
|  | 1 | 2 | 3 | 4 |
| PBBA | 1 | 2 | 1 | 1 |
| ZMTI | 0 | 0 | 1 | 0 |
| MTI | 0 | 0 | 0 | 1 |

Figure 3:
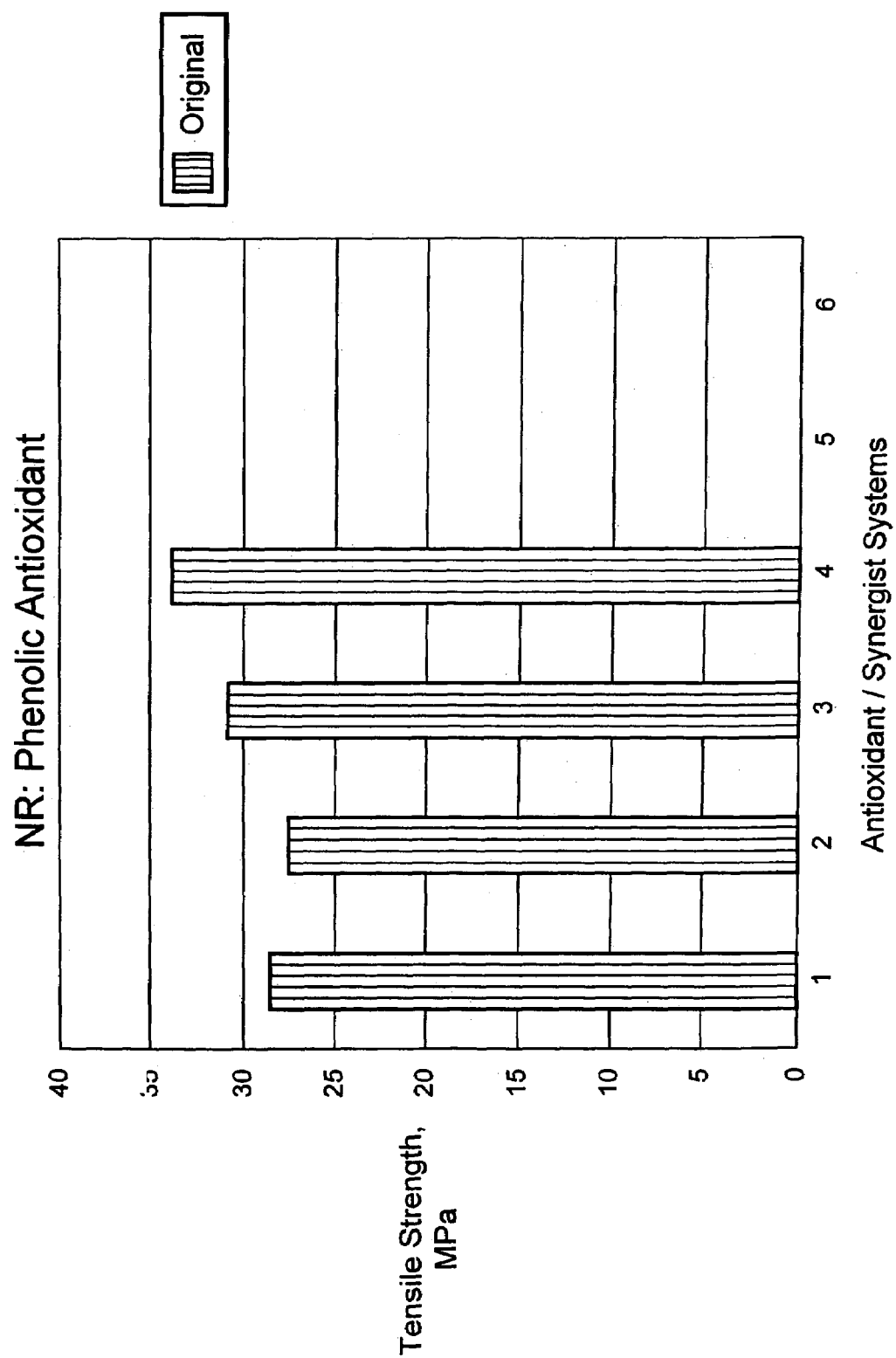
FIG. 3 is a chart showing the effect of a 30 minute cure at 100° C. on tensile strength when phenolic antioxidant polybutylated bisphenor A (PBBA) and the antioxicany synergists ZMTI and MTI were added.

FIG. 3 shows the effect of a 30 minute cure at 100° C. on tensile strength. It can be seen that the combination of phenolic antioxidant with a antioxidant synergist (tests 3 and 4) increases tensile strength relative to the addition of phenolic antioxidant alone (test 1 and 2). Note that doubling the amount of phenolic antioxidant (test 2) actually decreases tensile strength.

Figure 4:
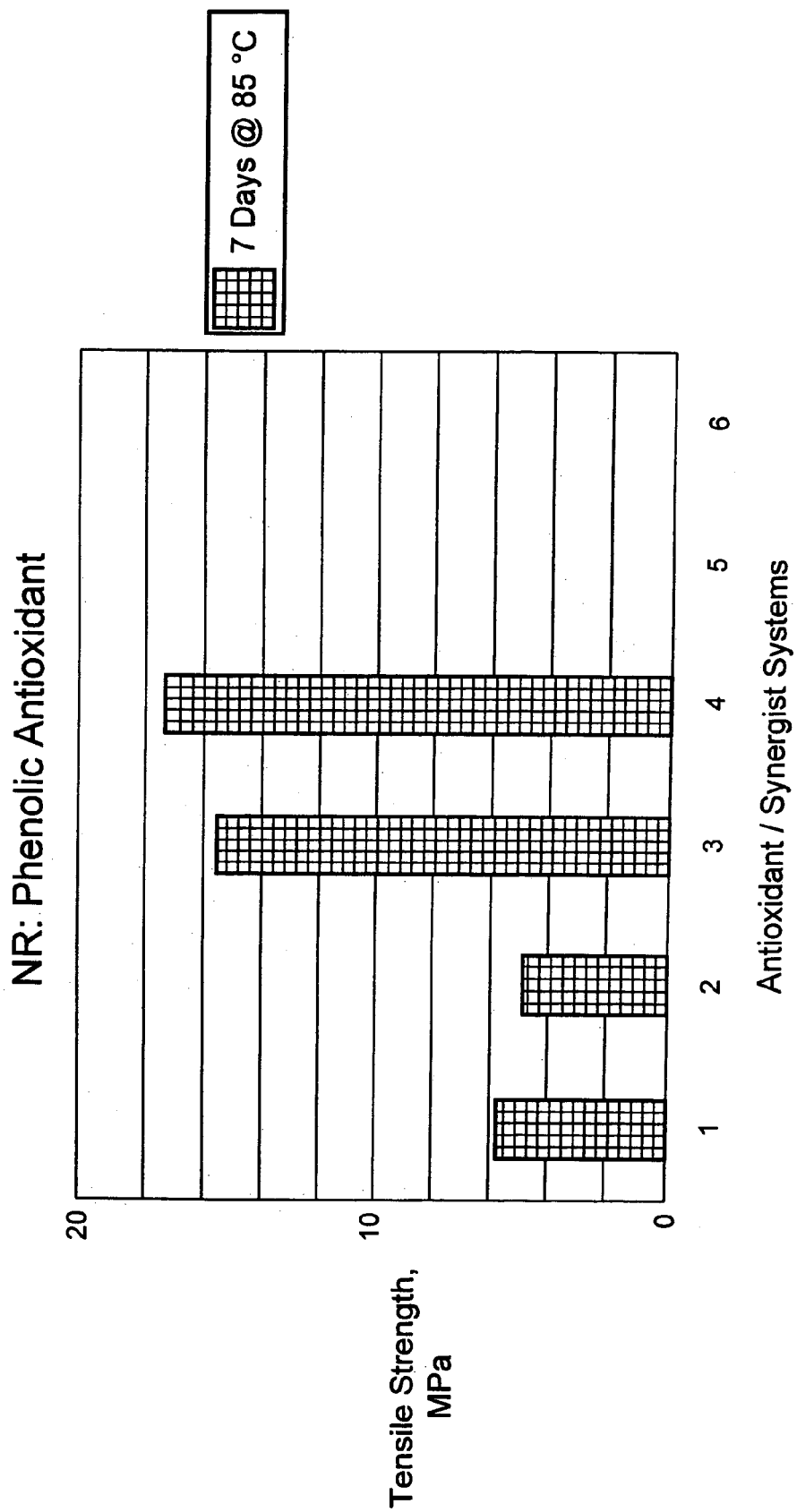
FIG. 4 is a chart showing the simulation of the aging process of the natural rubber when exposed to temperatures of 85° C. for 7 days.

To simulate the aging process of the natural rubber, the compositions were exposed to temperatures of 85° C. for 7 days, a more rigorous testing condition for tensile strength than 100° C. for 24 hours. The results are seen in FIG. 4.

While compounds which only had an antioxidant (tests 1 and 2) added experienced a radical drop in tensile strength (about 80%), the combination of antioxidant and antioxidant synergist (tests 3 and 4) experienced a less radical drop and resulted in products which possessed about 3× the tensile strength of their counterparts in test 1 and 2.

Example 3

Synthetic Rubber with Phenolic Anti-oxidant

Polychloropropene is the base polymer, sodium lauryl sulfate is the stabilizer, sulfated methyl oleate is the film surface conditioner and zinc oxide, tetramethylthiuram disulfide and dithiocarbamate accelerator comprise the curing system.

|  | PHR |
| --- | --- |
| Polychloropropene from Latex (CR) | 100 |
| Sodium Lauryl Sulfate | 1 |
| Zinc Oxide | 5 |
| Dithiocarbamate Accelerator | 0.75 |
| Tetramethylthiuram Disulfide | 1 |
| Sulfated Methyl Oleate | 1 |

To this composition, a phenolic antioxidant, (PBBA), and antioxidant synergists were added as follows:

|  | PHR | | | | | |
| --- | --- | --- | --- | --- | --- | --- |
|  | 1 | 2 | 3 | 4 | 5 | 6 |
| PBBA | 1 | 2 | 1 | 1 | 0 | 0 |
| Zinc 2-mercaptotoluimidazole | 0 | 0 | 1 | 0 | 1 | 0 |
| 2-Mercaptotoluimidazole | 0 | 0 | 0 | 1 | 0 | 1 |

Figure 5:
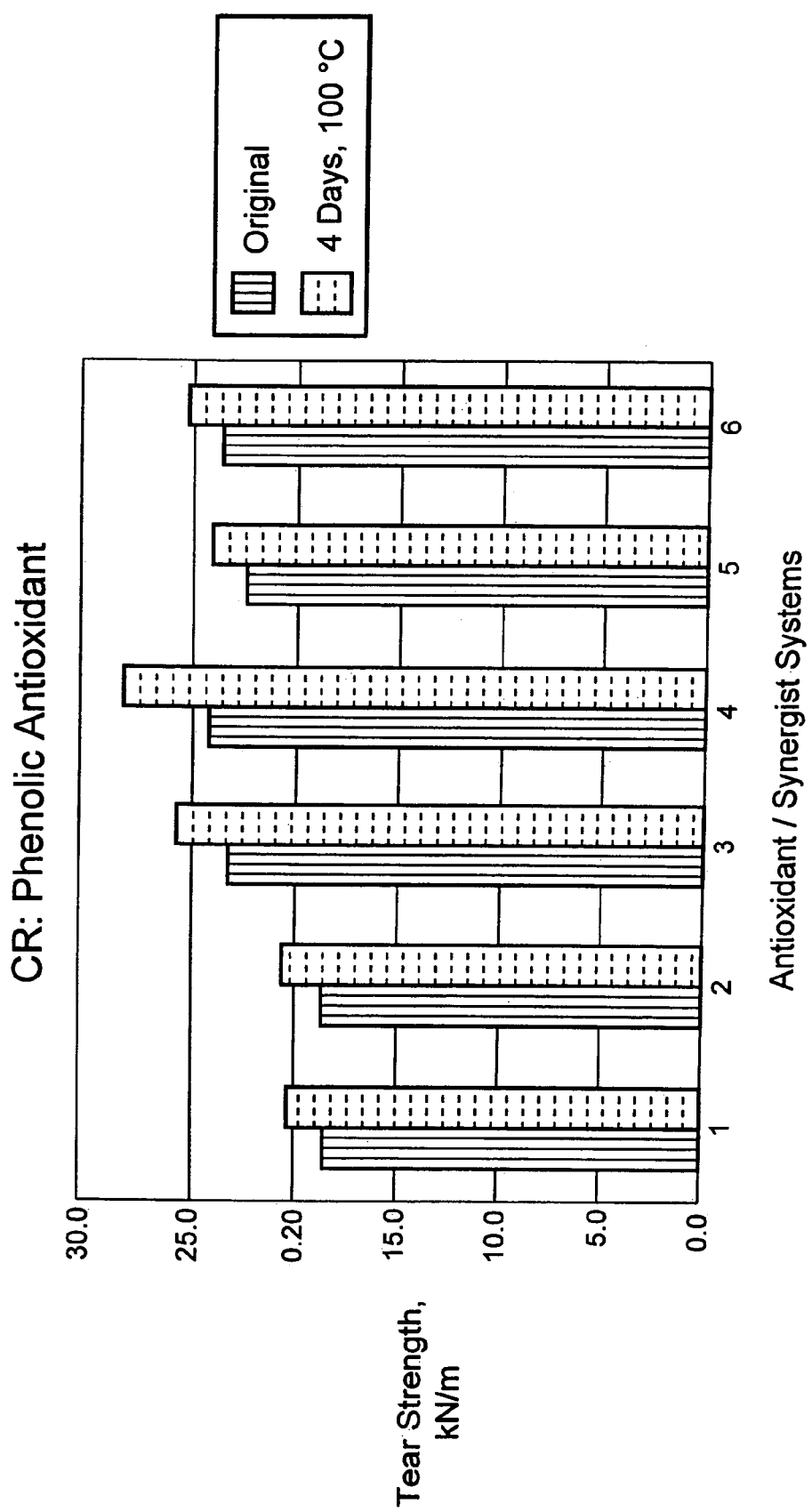
FIG. 5 is a chart showing the effect on tear strenght of aging the synthetic rubber for 4 days at 100° C. following a 45 minute cure at 141° C.

FIG. 5 shows the effect on tear strength of aging the synthetic rubber for 4 days at 100° C. following a 45 minute cure at 141° C.

Figure 6:
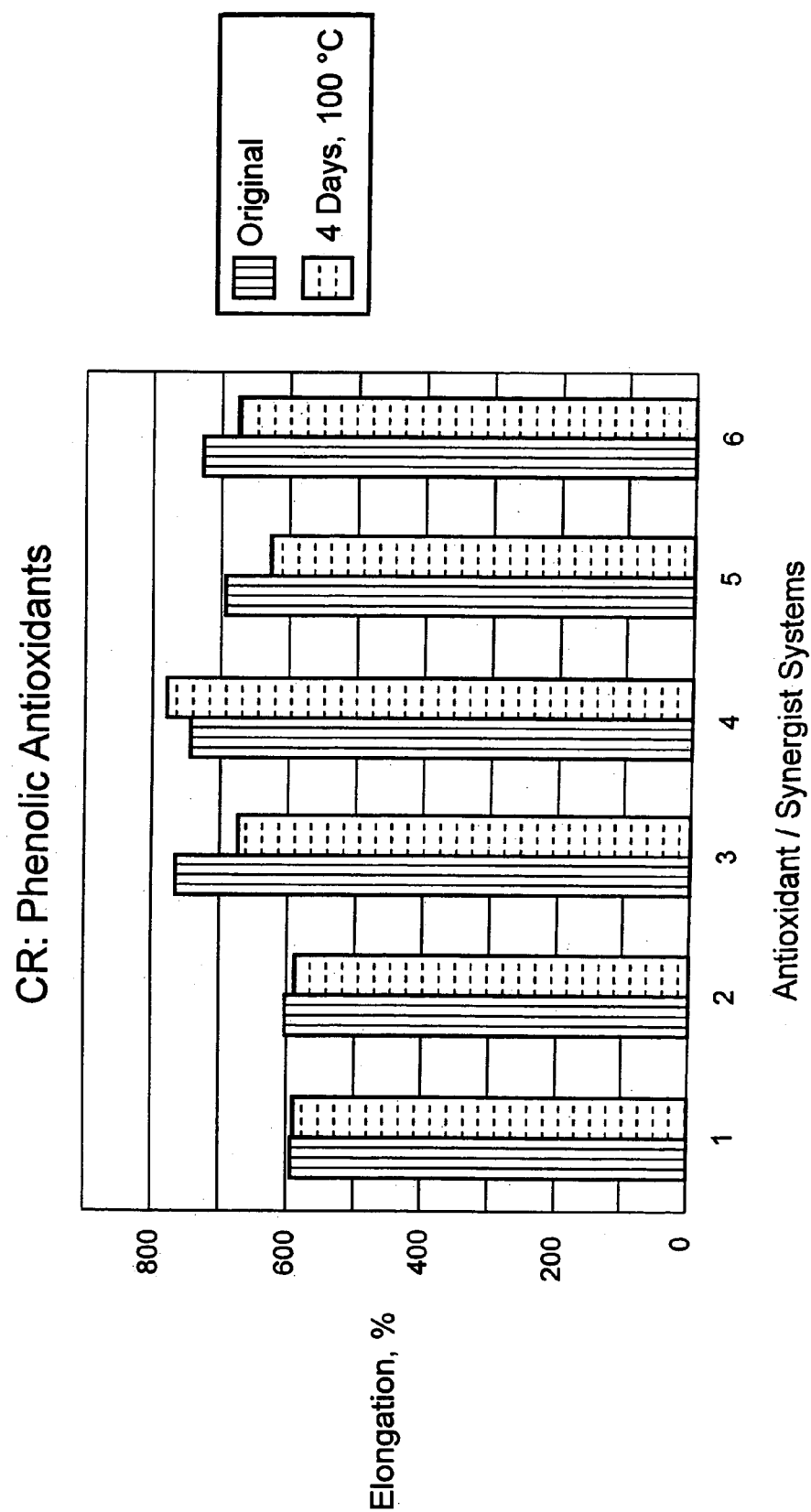
FIG. 6 is a chart showing the results of testing of FIG. 5 on elongation.

It can be seen that films containing a combination of phenolic antioxidant with an antioxidant synergist (tests 3 and 4) result in greater tear strength relative to adding antioxidant alone (test 1 and 2) both before and after aging. For the case of synthetic rubber films, degradation results in continuous crosslinking. Hence, since all of the tests show increased tear strength after aging, it must be determined if this property is gained at an undue expense to elasticity (elongation). The results of testing elongation are shown in FIG. 6.

Once again the antioxidant and antioxidant synergist mixture (tests 3 and 4) results in better elasticity (elongation) relative to antioxidant alone (test 1 and 2) or antioxidant synergist alone (tests 5 and 6).

Example 4

Synthetic Rubber with Phenolic Anti-oxidant

A carboxylated, high acrylonitrile is used as the base polymer, sodium lauryl sulfate and potassium hydroxide are used as the stabilizers, sulfated methyl oleate is the film surface conditioner and the zinc oxide, dithiocarbamate accelerator and the tetramethylthiuram disulfide comprise the curing system.

|  | PHR |
| --- | --- |
| Carboxylated, High Acrylonitrile from Latex (XNBR) | 100 |
| Sodium Lauryl Sulfate | 1 |
| Zinc Oxide | 2 |
| Dithiocarbamate Accelerator | 0.75 |
| Potassium Hydroxide | 0.15 |
| Tetramethylthiuram Disulfide | 1 |
| Sulfated Methyl Oleate | 1 |

To this composition, a phenolic antioxidant, (PBBA) and antioxidant synergists were added as follows:

|  | PHR | | | | | |
| --- | --- | --- | --- | --- | --- | --- |
|  | 1 | 2 | 3 | 4 | 5 | 6 |
| PBBA | 1 | 2 | 1 | 1 | 0 | 0 |
| Zinc 2-mercaptotoluimidazole | 0 | 0 | 1 | 0 | 1 | 0 |
| 2-Mercaptotoluimidazole | 0 | 0 | 0 | 1 | 0 | 1 |

Figure 7:
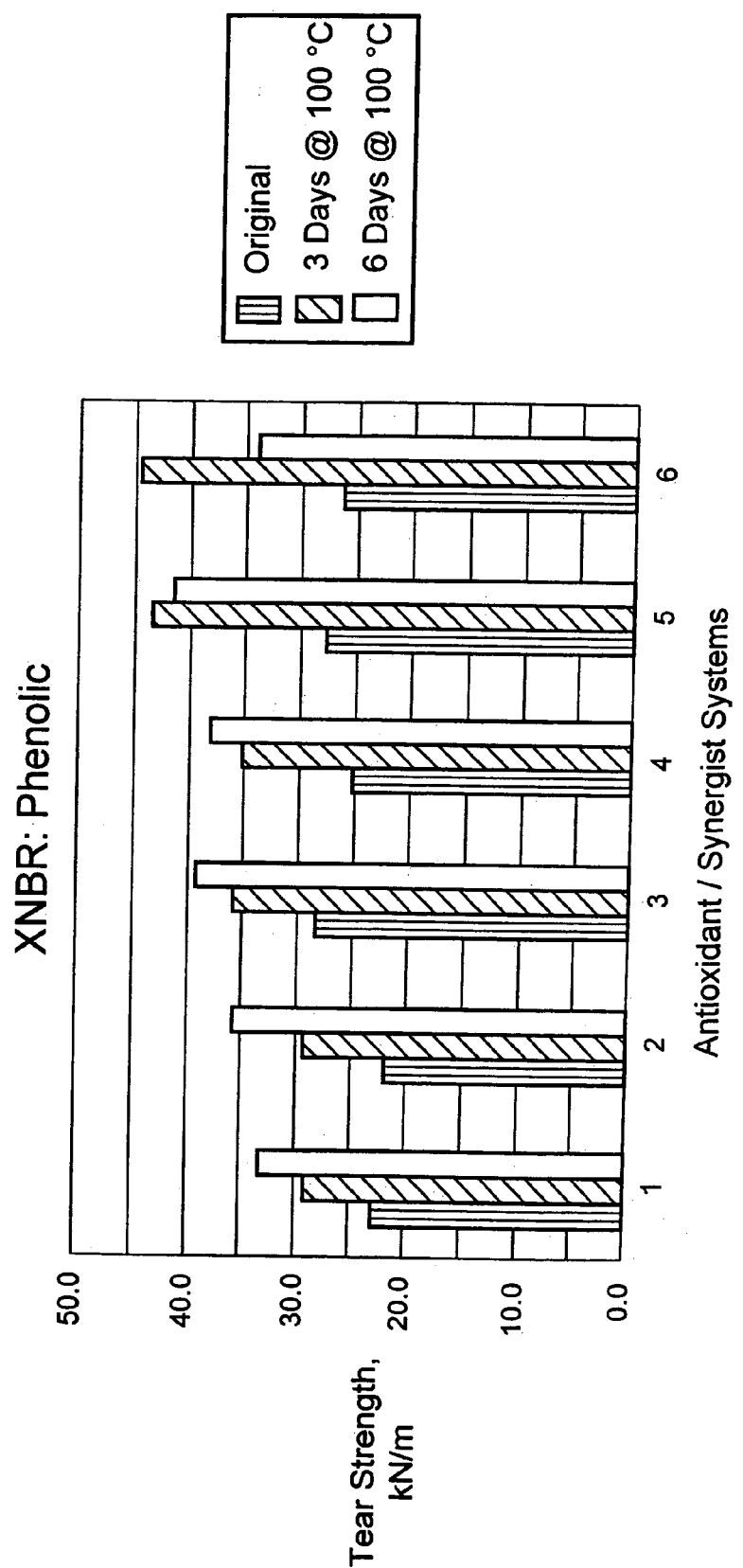
FIG. 7 is a chart showing the original tear strength after curing and the effects of aging at 100° C. for three and six days following a 30 minute cure at 121° C.

FIG. 7 shows the original tear strength after curing and the effects of aging at 100° C. for three and six days following a 30 minute cure at 121° C.

Figure 8:
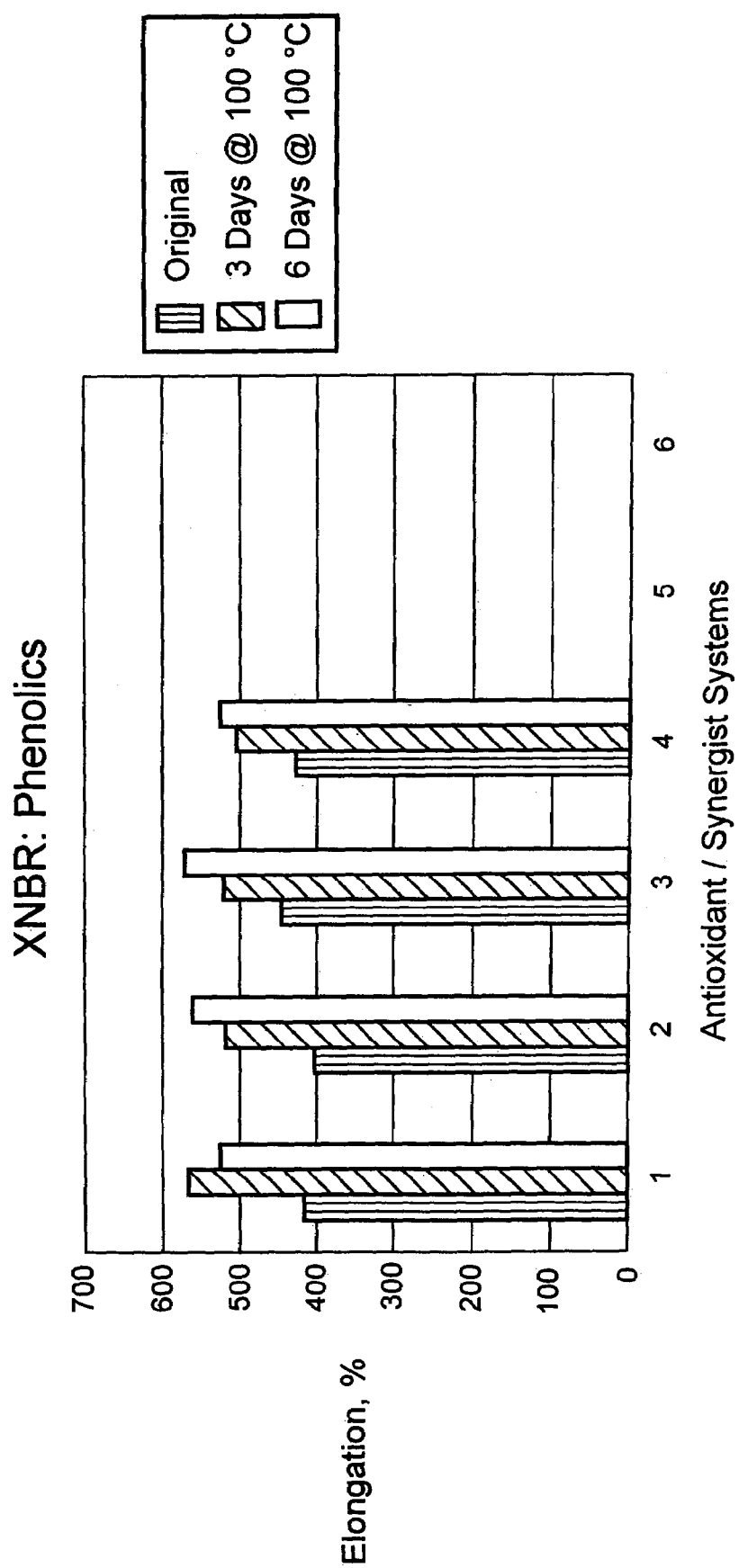
FIG. 8 is a chart showing the effect of the test conditions of FIG. 7 on elongation.

The antioxidant and antioxidant synergist combination (tests 3 and 4) displayed better tear strength than the antioxidant alone. The films of the antioxidant synergist alone (test 5 and 6) were eliminated from further consideration because following three days aging at 100° C., the tear strength began to deteriorate. This indicates that the state of optimum crosslinking was exceeded. FIG. 8 shows the effect of the test conditions on elongation.

The antioxidant and antioxidant synergist combinations (tests 3 and 4) proved to be as good as the antioxidant alone (test 1) and was about as effective as doubling the amount of antioxidant (test 2). In addition, test 1 showed a decrease in elasticity (elongation) the longer it was exposed to the aging conditions unlike tests 2–4 which showed an increase in elasticity. When considering the combination of tear strength and elasticity, the use of antioxidant and antioxidant synergists produced synthetic rubbers with enhanced properties but without sacrificing elongation.

It should be understood that the preceding is merely a detailed description of a depicted embodiment of this invention and that numerous changes to the depicted embodiments can be made in accordance with the disclosure herein without departing from the scope of the invention. This invention will have impact not only on the latex glove industry but also thread, balloon and other related latex industries. Therefore, the preceding description is not meant to limit the scope of the invention; the scope is to be determined by the appended claims and their equivalents.

What is claimed is:

1. A latex film compound comprising the reaction product of: a) an antioxidant b) a mercaptoarylazole compound c) a polymer d) a curing system.

2. The compound of claim 1 wherein the mercaptoarylazole compound is 2-mercaptotoluimidazole or 2-mercaptobenzimidazole, or a salt thereof.

3. The compound of claim 2 wherein the salt is a zinc salt.

4. The compound of claim 1 wherein the mercaptoarylazole compound is the zinc salt of 2-mercaptotoluimidazole.

5. The compound of claim 1 wherein the antioxidant comprises a phenolic antioxidant.

6. The compound of claim 1 wherein the antioxidant comprises an amine antioxidant.

7. The compound of claim 5 wherein the phenolic antioxidant is polybutylated bisphenol A.

8. The compound of claim 6 wherein the amine antioxidant is octylated diphenylamine.

9. A latex glove formed from a latex film of the compound of any one of claims 1–8.

10. The compound of claim 1 wherein the mercaptoarylazole compound is the zinc salt of 2-mercaptobenzimidazole.

11. A latex glove formed from a latex film of the compound of claim 10.

* * * * *